United States Patent [19]
Wolfelsperger

[11] 3,736,721
[45] June 5, 1973

[54] METHOD FOR MAKING A SKIN PACKAGE USING A SINGLE FILM WEB

[76] Inventor: Robert O. Wolfelsperger, 23 Glenroy Road, Fairfield, N.J. 07006

[22] Filed: May 10, 1971

[21] Appl. No.: 141,520

[52] U.S. Cl. .................................53/22 A, 53/112 A
[51] Int. Cl. .............................................B65b 31/02
[58] Field of Search ...........................53/22 A, 112 A

[56] References Cited

UNITED STATES PATENTS

| | | | |
|---|---|---|---|
| 2,565,444 | 8/1951 | Waters | 53/112 A |
| 3,195,288 | 7/1965 | Sloan et al. | 53/112 A X |

Primary Examiner—Travis S. McGehee
Attorney—Ralph R. Roberts

[57] ABSTRACT

A method and apparatus is provided for forming a skin package particularly for food products, hardware and the like in which a single film web is arranged around the product and by pressure differential is formed around the product. A pair of U-shaped chamber members is disposed to slidably engage the open ends of each other to form a sealed chamber with the film retained against or nearly against three sides of the chamber. After the film has been brought to a heated heat-sealable condition, atmosphere or low pressure air is used to push the film tightly around the product and into sealing condition with facing portions of the same film.

5 Claims, 12 Drawing Figures

INVENTOR.
ROBERT O. WOLFELSPERGER
BY
*Ralph R Roberts*
AGENT

PATENTED JUN 5 1973 3,736,721

INVENTOR.
ROBERT O. WOLFELSPERGER

BY
Ralph R. Roberts
AGENT

METHOD FOR MAKING A SKIN PACKAGE USING A SINGLE FILM WEB

BACKGROUND OF THE INVENTION

1. Field of the Invention

In accordance with the classification of art as established in the U.S. Pat. Office this invention pertains to the general class of "Package Making" and more particularly to the subclass of packages wherein the "contents are treated with vacuum or inert atmosphere". This method of packaging and the apparatus for performing the method pertains to the packaging of a product in a hermetically sealed package.

2. Description of the Prior Art

The packaging of products in thermoplastic film and with the packaged product in a condition of partial vacuum is, of course, well known in the art and the broad concept of forming a package in or with the assistance of vacuum is also well known. The problems solved by the patents directed towards the packaging of pharmaceutical products, processed sliced meats, cheeses and the like, are directed toward products which generally are of a like size and configuration and generally uniform in the composition of the product. There are, however, many problems in the packaging of dissimilar sized products such as fresh meat products, including subprimals and fowl, fish and the like. Among these problems are irregularity of size of the product, looseness of the film covering and incomplete sealing of the package. Causing these conditions are failure of the sealing of the package at its edge or edges, preforming the film to a dimension greater than the product size, and permitting the pressure inside the package to approach or reach atmospheric pressure.

In the packaging of products where there are voids in the product which persist during and after the packaging of the product the packaging tends to remain tight to the product when the package is hermetically sealed and where the product and voids are under a negative or reduced pressure in the package. When the package interior approaches or is at atmospheric pressure, the package tends to become loose in part or may become completely loose particularly if, in the handling thereof, the package has been roughly treated.

In the skin packaging of cold meats and in both regularly and irregularly shaped items such as hardware, the packaging in the presence of vacuum usually contemplates the preforming of a blister portion in one member of the package before this member is brought to the final step of packaging. Products so packaged tend to be slightly smaller than the enclosing package hence the product is not usually tightly retained and often, after much handling appears at a less than satisfactory condition. In nearly all, if not all, presently known skin packaging apparatus and methods at least one film is brought to a warmed, heat-sealing condition, another like or compatible film is provided as a companion member. Two films are usually provided unless a pouch or tube is to be used.

In the present invention there is provided apparatus and method for forming a skin package in which only one film is provided. This film is conditioned to be stretched tightly around the product and to be sealed to an opposite portion of the same film. Such a package accommodates irregularly shaped products including those having voids.

SUMMARY OF THE INVENTION

This invention provides a method and apparatus wherein pharmaceuticals, fresh meat, fish, irregularly shaped hardware items and the like are packaged so that a single film cover encloses the product and is caused to tightly engage the product and where voids in the product being packaged are present the product is brought to a condition of reduced pressure. The package so formed has one film arranged to provide the upper and lower member. This film is thermoplastic and engages the outer portion of the product to form the package wrap. The resulting package has its inner portion under reduced pressure so that the cover portion is tightly conformed to the shape, usually irregular, of the product being packaged.

The method of this invention contemplates that the product to be packaged is placed upon a bottom portion of the film which is a thermoplastic film. The inner surface of the film is adapted for heat sealing to itself. To effect the seal at least one portion forming either the upper or lower film member is brought to a determined heated condition. A pair of U-shaped members, disposed at right angles to each other are carried by means toward each other to form a chamber which is preferably a movable chamber and for the purpose of identification is called a mid-chamber. Preferably the mid-chamber is carried by a belt, chain or other endless machine apparatus. Either or both U-shaped members are movable toward each other and to engage the film to seal the film within the chamber. When so sealed, the film is heated by causing at least a portion of the film to be moved into contact with the inner surface of the mid-chamber by means of a pressure differential. When the film is brought into contiguous engagement with the heated surface which is heated to a determined temperature, the film is maintained against this heated surface until it, the film, has reached a determined heated condition.

The product to be packaged is placed on the lower extent of film before the chamber is closed and after closing, the product and the area between the upper and lower extent of film is caused to be brought to a condition of reduced pressure whereupon the outer surfaces of the upper and lower extents of film adjacent to the chamber are caused to be exposed to atmospheric pressure resulting in the softened heated film portions being moved towards each other and around the product. When the warmed upper and lower extents of film meet and are forced into engagement with each other they are caused to be sealed to each other in a heat sealed condition. After the film has been formed around the product and heat sealed to itself the source of reduced pressure is shut off and the chamber is caused to be opened and the packaged product is delivered for trimming, storage and other conventional operations.

There has been chosen a specific embodiment of apparatus for producing the package of this invention as well as an alternate U-shaped configuration of the U-shape for use in the producing of the package and showing a preferred method for packaging a product having irregular shapes and often voids. This specific embodiment and an alternate thereof have been chosen for the purposes of illustration and description as shown in the accompanying drawings wherein:

BRIEF DESCRIPTION OF THE DRAWINGS

In the following description and in the claims various details will be identified by specific names for convenience, these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE EMBODIMENT OF FIGS. 1–6

Figure 1:
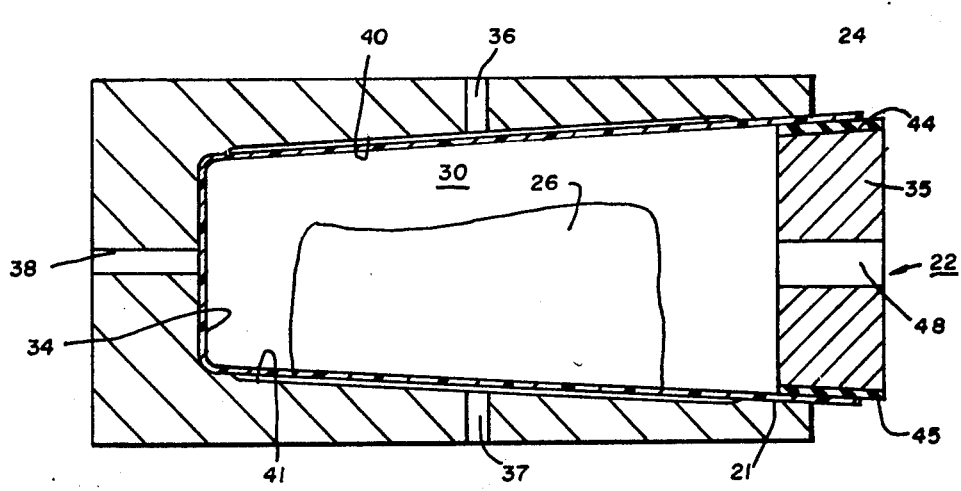
FIG. 1 represents a cross-sectional view of a package forming chamber wherein a single film is held against the wall of a U-shaped chamber by means of a mating U-shaped chamber piece adapted to engage and retain the film in a determined condition until formed around the product.
Figure 4:
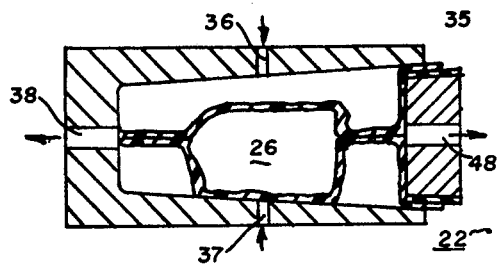
FIG. 4 represents a sectional view of the chamber of FIG. 3 and with the package in its formed condition after atmosphere or low pressure air has been admitted to the chamber to cause the film to be tightly wrapped around the product and to be sealed to itself to form a hermetically sealed package.
Figure 5:
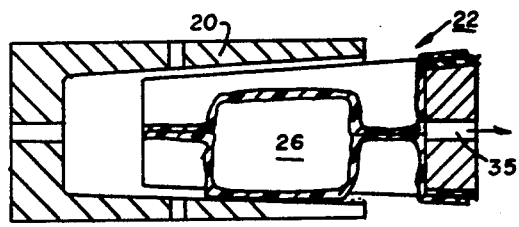
FIG. 5 represents a sectional view of the package of FIG. 4 with the inner chamber portion and package in the process of being separated so that the packaged product may be stripped from the chamber.
Figure 6:
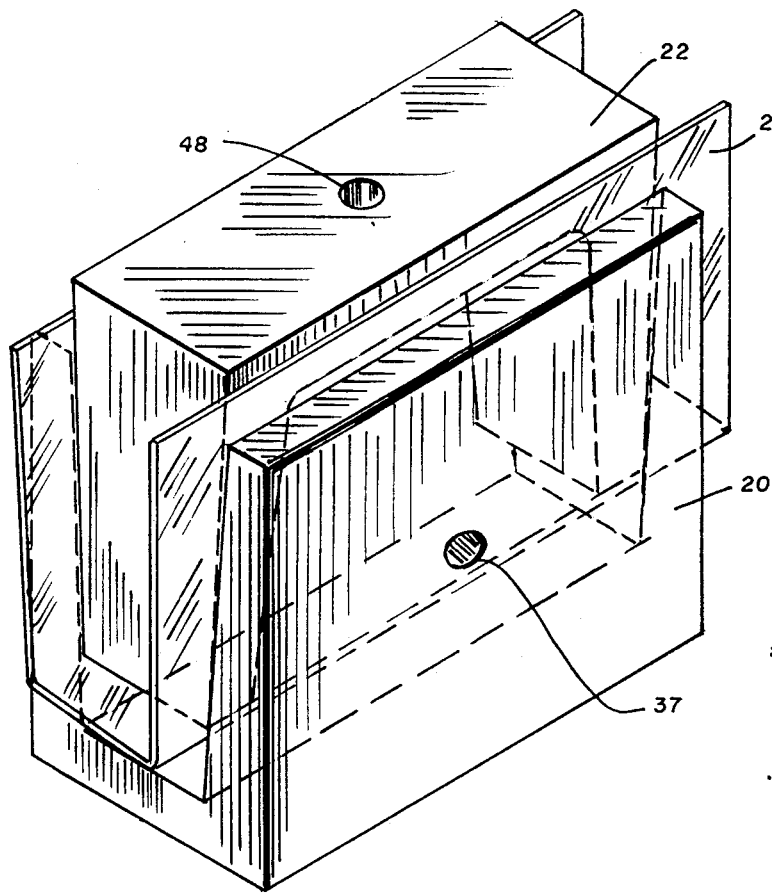
FIG. 6 represents an isometric view of the chamber of FIG. 1 in about the assembled condition of FIG. 2 and showing in particular the arrangement of the single strip of film as retained in the chamber prior to the closing of the chamber and forming of the film and sealing of the product.

Referring now to the apparatus as shown in FIGS. 1 through 6 it is to be noted that as particularly seen in FIGS. 1 and 6 the chamber of this embodiment comprises two pieces both having a U-shaped configuration. An outer chamber portion 20 is of a determined length and width with a U-shaped contour opening 21 formed longitudinally through the median section of this chamber. The U-shaped contour as seen in FIG. 1 is tapered from a narrow inner left end to a greater open right end at approximately five degrees to the center line or plane or the U-shaped contour. The tapered walls as they converge toward the left end or back wall of the contoured opening are contemplated as providing an equal taper permitting ready engagement or disengagement of the contoured opening 21 by a like tapered center member 22 when it is brought in way of the opening. The matching tapers are selected so as to be a non-locking taper. A single web or film 24 is of a sufficient width so as to be brought against and lay on the upper and lower surfaces and left end wall of the U-shaped member 22. This member has a U-shaped contour formed therein and disposed in a transverse manner to provide tapered end walls with a longitudinal connecting bar therebetween. The leftwardly extending end walls of member 22 are tapered at the same degree of taper as is the taper of the U-shaped opening 21 of member 20.

Figure 2:
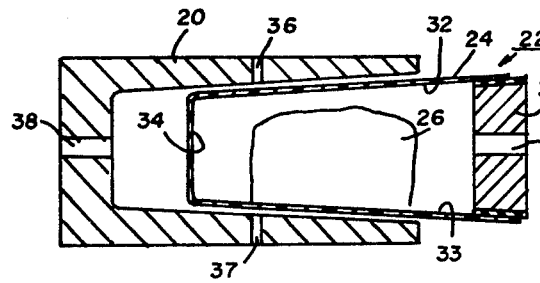
FIG. 2 represents, in a smaller scale, the sectional view of the chamber of FIG. 1 but with the chamber components in a disassembled condition and showing the single film carried on the inner chamber portion prior to the chamber being brought to a closed condition.

The single strip of film 24 prior to its being wrapped along three sides of member 22 may have a product 26 placed on the lower extent of film after which the film is brought around the member 22 as in FIG. 2; then it is moved in way of and into a nesting position in the chamber portion 20. After positioning the member 22 is further moved into a determined snug engagement in opening 21 to lightly compress the film and to provide a closed and sealed inner chamber 30 with the film 24 engaging and being positioned by center member 22 as it is brought into the tapered U-shaped contoured opening 21 of member 20.

OPERATION OF THE CHAMBER OF FIGS. 1 AND 6

Whether the chamber portion 20 is oriented in a horizontal or a vertical condition is merely a matter of choice. Positive placement and support for the product 26 to be packaged is at least one of the controlling considerations and required that the product 26 be readily placed upon at least a partial expanse of the film 24 and supported thereon as the operation of packaging the product is accomplished.

The steps of closing the chamber and forming the package is particularly shown in the sequence depicted in FIGS. 2, 3 4 and 5. In FIG. 2 the product 26 has been placed on the lower extent of the film 24 which has then been folded around the left end and the upper and lower tapered sides of member 22. For identification the upper tapered face, lower tapered face and left ends of the inwardly extending end members of the member 22 are respectively identified as 32, 33 and 34. The film 24 is drawn tightly to these faces with the product being retained between the upper and lower portions of the film and between the left end portion of the film 24 and the connected or right beam member 35 of the center member 22. As particularly seen in FIGS. 2 through 5 there is provided in the outer chamber portion 20, ports 36, 37 and 38 which provide access to the internal surfaces of the U-shaped contoured opening 21 of member 20. As particularly seen in FIG. 1 there is preferably formed in these internal surfaces of the U-shaped contoured opening 21 locally disposed upper and lower recessed portions identified as 40 and 41. These recessed portions do not extend into the end portions of the contoured opening 21 which is disposed to engage the member 22. Between the ends of member 20 the recessed portions 40 and 41 permit a small amount of spacing between the film 24 and the upper and lower side walls of the U-shaped opening 21 formed in member 20. These recesses may be in the form of grooves or may be a shallow recess providing a few thousandths of an inch space between the film 24 and the surface of the U-shaped contour opening 21 of the member 20 preferably establishing a communication of a port or ports with substantially all of the outer areas of the upper and lower surface portions of film 24 within the tapered contoured opening 21 not engaged by member 22.

Figure 3:
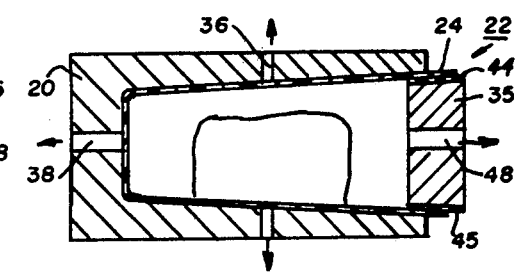
FIG. 3 represents a sectional view of the chamber components of FIG. 2 now moved into an assembled condition such as seen in larger detail in FIG. 1, the chamber being in a closed condition prior to the forming of the package therein.

As seen in FIG. 3 the member 22 has been inserted into the U-shaped opening 21 to effect a locking or sealing condition of the chamber with film 24 brought in way of and tightly engaged between member 20 and member 22. A small resilient gasket member 44 and 45 is preferably provided on the upper and lower surfaces of bridge 35 of member 22 to insure sealing of the film 24 in the U-shaped contoured opening 21. A gasket not shown is also provided in either the end portions of opening 21 or in the face portions 32, 33 and 34 of the inwardly extending member portions of center member 22. It is to be noted that an access opening or port 48 is provided in member 22 so that with the product 26 disposed in the middle of the chamber 20 and with the center member 22 in a sealing condition therein, the ports 36, 37 and 38 are brought into a condition of reduced pressure after which opening or discharge 48 is connected to a source of vacuum so as to bring the interior of the chamber and the product 26 to a condition of reduced pressure. Either or both of the members 20 and 22 may be provided with a heating source. The film 24 may also be heated to a determined condition before the chamber 30 is formed with film 24 as in FIG. 3.

After a determined condition of vacuum or reduced pressure has been induced into the inner sealed chamber 30 and the product 26 the product is then sealed in the single strip of film 24. This is best seen in FIG. 4 which depicts film 24 as having been pushed into a tight sealing condition around the product 26 by permitting the ports 36 and 37 to be open to atmospheric air so that the upper and lower portions of film 24 may be pushed to and around the product 26 and into a heat sealing condition with each other. It is contemplated that during this application of atmospheric air through the ports 36 and 37 that the ports or openings 48 and 38 may, for a short while, be still connected to a vacuum source to permit the ready forming of the heated or otherwise sealable film around the product 26. After the package is sealed, the ports 48 and 38 are also opened to atmospheric air after which the chamber is opened as seen in FIG. 5. The packaged product is then slid from the chamber with the movement of center member 22 rightwards. The center member 22 has the packaged product partially retained thereon until the packaged product and film have been stripped from the member 22 and trimmed by equipment not disclosed.

In the above described apparatus and operation there has been no mention of or a showing of clamps for holding film 24 in position on member 22 during the preparing and moving of this member of FIG. 2 to FIG. 3. Clamps are contemplated as being used to position and retain film 24 but as the clamps to be used may be provided in many shapes and operations they are not shown as no patentable distinction is ascribed to a clamp means.

ALTERNATE EMBODIMENT OF FIGS. 7 AND 8

Figure 7:
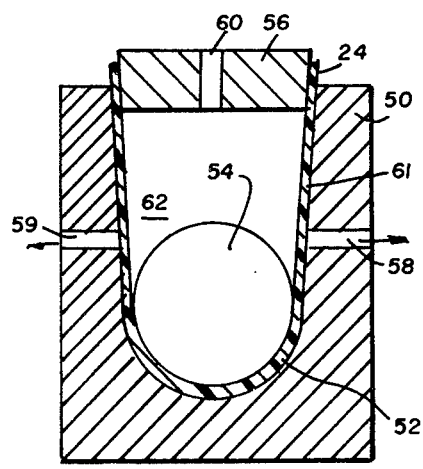
FIG. 7 represents a sectional view of an alternate chamber configuration which is a modification of the chamber of FIG. 6 with the outer chamber portion arranged to be open upwardly so that a loose product may be dropped into the chamber and onto the single strip of film which is to provide the wrap of the package.
Figure 8:
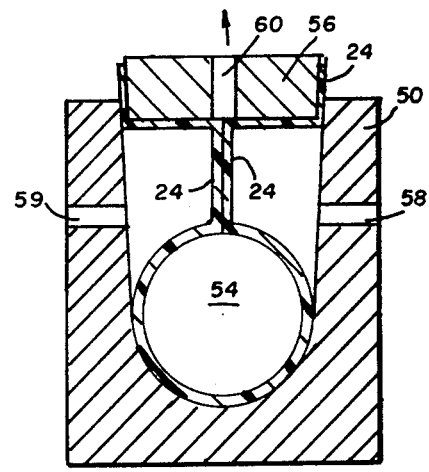
FIG. 8 represents the sectional view of the chamber of FIG. 7 with the product now in a sealed package provided by the single film.

Referring next to an alternate embodiment as shown in FIGS. 7 and 8 there is provided a chamber for packaging a cylindrical item such as sausage or an ear of corn. In this alternate embodiment the member 20 of FIG. 6 now identified as member 50 is formed with U-shaped contoured opening 51 having a rounded surface 52 into which the film 24 is urged. The product 54 is then dropped into the trough formed by film 24 after which a center chamber portion 56 having extending end members of generally U-shape is disposed to be pushed into place as seen in FIG. 7. The ends and longitudinal portion of center chamber portion 56 engage film 24 to form a sealed chamber. The vents or ports 58 and 59 in member 50 are connected to sources of vacuum and also to atmospheric pressure or pressurized gas. In like manner the inner chamber 56 also has a port 60 which is selectively connected to both pressurized or atmospheric air and also to a source of vacuum.

USE AND OPERATION OF CHAMBER OF FIGS. 7 AND 8

In the manner of the chamber of FIGS. 1 through 6 and the operational sequence as shown in FIGS. 2 through 5 it is contemplated that the chamber 50 will be brought in way of a loading station with film 24 stretched into a channel or trough 61 after which the product 54, which may be a sausage or like product, is placed in the film 24 after which member 56 is pushed into sealing condition to provide a closed chamber 62 as seen in FIG. 7. After bringing the chamber into a sealed condition the ports 58 and 59 are connected to a source of vacuum so that the film 24 is tightly drawn to the side walls of member 50 whereat it may be heated or if it has been warmed prior to its placement in the contoured opening 51 of chamber 50 may be retained in or brought to a sealing condition. Port 60 is then connected to a source of negative pressure or vacuum so that the interior of the closed chamber 62 as well as the product 54 is brought to a condition of reduced pressure. The ports 58 and 59 are then opened to the atmosphere or to pressurized air causing the side portions of film 24 within the chamber to be urged toward each other and into a tightly enclosing condition around product 54 with the facing film portions forced into a heat sealed condition as seen in FIG. 8. The port 60 is left connected to a source of reduced pressure during the time ports 58 and 59 are opened to the atmosphere so as to insure that the two side portions of film 24 meet each other and are formed into a sealed condition.

After the product 54 has been sealed in the single strip of film 24 it is contemplated that port 60 will be closed to vacuum after which this port is opened to atmospheric pressure so that all interior portions of the closed chamber 62 are brought to atmospheric pressure whereupon the center member 56 and the packaged product 54 are withdrawn or lifted from the U-shaped contoured opening 51 in member 50. After removal of the packaged product 54 from member 56 the excess film around product 54 is trimmed by conventional means to provide the desired heat sealed vacuum packaged product.

ALTERNATE EMBODIMENT OF FIGS. 9 THROUGH 12

Figure 9:
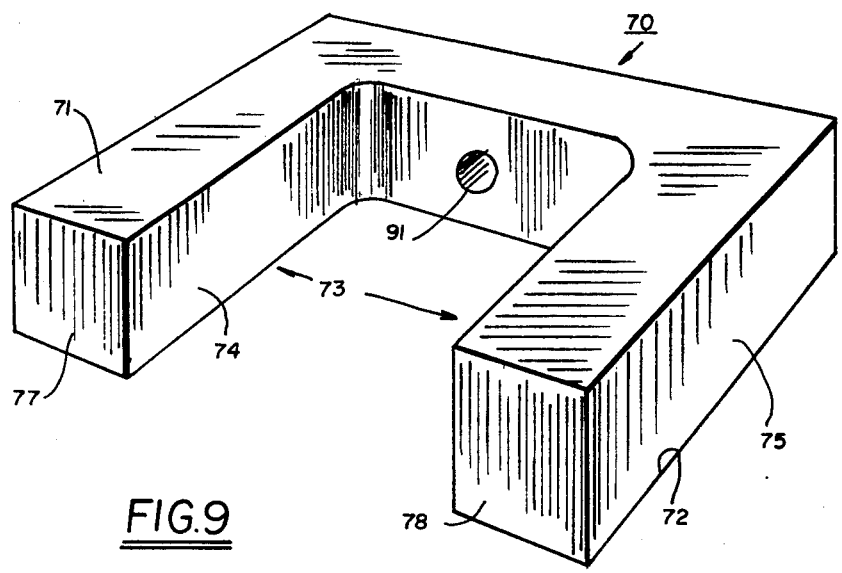
FIG. 9 represents an isometric view of a U-shaped portion of a chamber which portion provides three walls of an alternate embodiment of a mid-chamber whose fourth wall is a bar.
Figure 10:
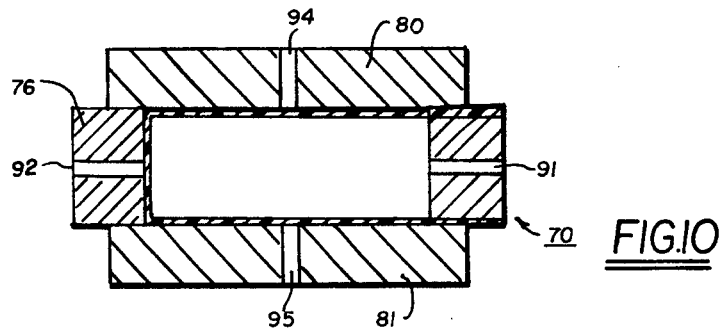
FIG. 10 represents a sectional view wherein the U-shaped member of FIG. 9 has its open end closed by a bar or end piece to form a mid-chamber and opposed upper and lower platen members are provided and are brought in way of the U-shaped member and bar to cause a single film to be arranged as upper and lower members to make a package from a single film.

It is of course realized that instead of a two-piece chamber as seen in FIGS. 1, 6 and 7 that these two-piece chambers can be made as several members which are shaped and assembled to provide a chamber for vacuum packaging. For example, it is contemplated that a U-shaped center member 70 as seen in FIG. 9 will have parallel upper and lower faces or surfaces 71 and 72 and will have a U-shaped contoured recess 73 formed between extending leg portions 74 and 75 of the member. A bar member 76 (FIG. 10) is disposed to extend the full width of member 70 and is adapted to be brought in way of the outer facing surfaces 77 and 78 of legs 74 and 75 of member 70. A gasket, not shown, may be provided to seal the joint between bar 76 and the ends 77 and 78 as they are brought against said bar 76. Upper and lower platens 80 and 81 are provided to cover the rectangular opening provided by the U-shaped contoured recess 73 and bar member 76 which when covered provides a closed inner chamber of substantially rectangular configuration. A film 24 is brought into and over the ends 77 and 78 onto or against surfaces 71 and 72 of member 70 during which a product 88 is placed on the lower extent of film after which it is sealed in the manner of FIGS. 1 and 6 or as in FIGS. 7 and 8 above-described.

USE AND OPERATION OF EMBODIMENT OF FIGS. 9-12

In the chamber of FIGS. 9-12 a port 91 is provided in member 70 for communication with the interior of the chamber when it is sealed. In bar member 76 a port 92 is also provided and the upper and lower platens 80 and 81 also have formed therethrough ports 94 and 95 to be used in the forming of the package. The product 88 is placed on the lower extent of film 24 during the time film 24 is initially placed in and around the upper and lower surfaces 71 and 72 of member 70. After the film is in place end member 76 is brought in way of the ends 77 and 78 of member 70. The upper and lower platens 80 and 81 are then brought into engagement with the film 24 to cause a sealing condition with member 70 and bar 76 and provide a sealed inner chamber.

Figure 11:
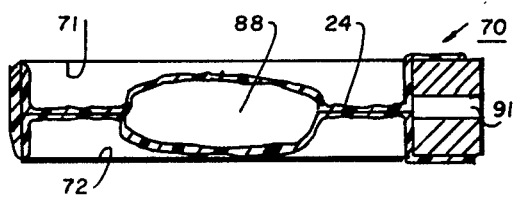
FIG. 11 represents a sectional view showing the U-shaped portion of FIG. 9 with the product after being packaged in the chamber and with the bar end removed as well as the upper and lower platens so that the product as packaged with the single strip of film may be removed from said U-shaped portion.

After this chamber is formed and sealed the film is brought to the desired condition for sealing to itself as by heating or other treating means, after or during which ports 92, 94 and 95 are connected to a vacuum source so as to draw and hold the film against the interior surfaces. Port 91 is then connected to a vacuum source to cause the interior of the chamber between the upper and lower film portions as well as the product 88 to be brought to a condition of reduced pressure. After a determined period of time the upper and lower ports 94 and 95 are closed to the source of vacuum and are then open to the atmosphere or low pressure air after which the upper and lower platens 80 and 81 are moved away from the packaged product as well as the end bar 76 which is also likewise removed. As now exposed the packaged product and the film are disposed upon and around the U-shaped center member 70 as seen in FIG. 11. Port 91 is now opened to the atmosphere after which the packaged product 88 is removed from member 70 and is then trimmed with the unwanted residue of film disposed of in the conventional manner.

Figure 12:
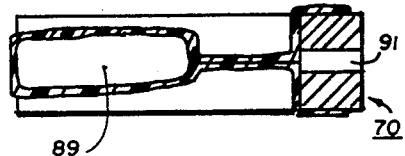
FIG. 12 represents a package formed as in FIG. 11 but with the product displaced to one side of the chamber, and as shown the product is adjacent to the removable bar end.

As seen in FIG. 12 it is not essential that a product 89 be placed midway of the inner chamber but instead may be placed at a side or end of the chamber so that only substantially one cutting or trimming of the extending fin of the film is required. This fin extends on only three sides of the package as seen in FIG. 12 when the product 89 has been moved to substantially the left end of the chamber with the film against the face of the bar 76. After the package forming procedure is accomplished as in FIG. 11 the packaged product appears as is seen in FIG. 12 with the packaged product 89 having an outwardly extending fin disposed around substantially only three sides of the product. The packaged product has a flat wall or end as its fourth side as seen at the left end of the package of FIG. 12.

CONCLUSION

For many reasons it is desirable to use a single film for packaging of a product. Among these reasons is that it reduces the gasketing required to seal a vacuum chamber and permits the packaging of irregular shaped and loose articles in an easy manner. The above-described apparatus provides means for ready packaging of meat, fish, hardware, sausages and also granular products in certain limited cases. The two member chamber shown in FIGS. 1, 6, 7 and 8 makes the formation of the chamber a very simple operation and the forming of the film into a U-shape a very easy thing to accomplish. Whether the chamber members are provided with heating sections or the film is exteriorly preheated or otherwise treated is merely a matter of choice since it is only necessary that the film surfaces to be sealed be brought to a desired sealing condition. Where the product to be packaged is difficult to retain or load onto the film 24 because of its size, weight or shape it is usually desirable to use the configuration of FIGS. 9 and 10 whereupon the film is first brought in way of the undersurface of the member 70 and is rested on the lower platen 81 which is brought into a supporting condition after which the product 88 is laid upon the lower portion of film. The film is then folded over the ends 77 and 78 and bar 76 is brought in way of the ends 77 and 78 to cause a seal to be effected after which the upper stretch of film 24 is laid on the upper surface 71 of the U-shaped center member 70 after which platen 80 is brought to the film to cause a seal of the chamber to be completed. The package forming sequence, as above-described, is effected to provide a hermetically sealed vacuum formed package.

Although the film 24 in FIGS. 1–5 is shown as being manipulated around the tapered center member 22, it is also contemplated that the film 24 may be manipulated so as to be first inserted into the contoured opening 21 before inserting the member 22 into this opening 21. In a like manner, in FIGS. 6, 7 and 8 the film 24 may be first mounted on or to center member 56 before insertion into the tapered opening of member 20 or member 50. The same reverse application is true in the use of the apparatus of FIGS. 9–12. Whether the film 24 is placed first around member 70 or on platen 81 is merely a matter of choice. In other words, the nature of the film, the size, shape, weight or like factors pertaining to the product or other factors such as feeds and/or speeds of handling the film will determine the placement of the product to the film 24 in the apparatus and these same factors will determine the sequence of presenting the film to the apparatus.

Although pouches and tubes formed from a single film are known in the trade, these insofar as is known are not used for vacuum skin packaging as above-described. The above packaging method as provided in the three above-exemplified embodiments, result in a single film skin package which is tightly formed around the product. The method for these three embodiments include the following steps: (a) providing an inner chamber member of generally U-shaped configuration; (b) drawing of a single web of thermoplastic film, so as to substantially cover and be placed against the two faces of the U-shaped inner chamber member and the ends of the extending legs defining the U-shaped configuration; (c) placing a product on one extent of the single film web so that the product is in the U-shaped opening and between the film placed against the faces of the chamber member; (d) forming a sealed closed chamber by closing the end of the U-shaped opening and providing opposed face covering members disposed to seal the film to the inner chamber member; (e) heating the opposed extents of film to a heat sealing condition for sealing to itself; (f) bringing the interior of the chamber area between the film portions to a negative pressure; (g) exposing the outer surface of the film to atmospheric air to cause the film to move tightly around the product and into heat sealed condition, and (h) opening the chamber to atmospheric air to permit disassembly of the chamber and removal of the vacuum skin packaged product.

Terms such as "left", "right", "up", "down", "bottom", "top", "front", "back", "in", "out" and the like are applicable to the embodiments shown and described in conjunction with the drawings. These terms, as used, are merely for the purposes of description and do not necessarily apply to the position in which the packaging chambers may be constructed or used.

While a particular embodiment of the packaging chambers for a single film and alternate embodiments thereof have been shown and described it is to be understood the invention is not limited thereto since modifications may be made within the scope of the accompanying claims and protection is sought to the broadest extent the prior art allows.

What is claimed is:

1. A method for forming a vacuum skin package from a single heat-sealable, heated film and a product including the following steps: (a) forming a film into a U-shaped configuration with a product positioned therewithin; (b) moving members together to provide a sealed chamber with the film tightly engaged between the members; (c) bringing outer surface portions of the film to a condition of reduced pressure thereby to move such surface portions into contact with inner surface portions of the members whereby to retain the U-shaped configuration of the film; (d) thereafter bringing the interior of the chamber and the product to a condition of reduced pressure; (e) thereafter exposing such outer surface portions of the film to atmospheric air to cause the film to move tightly around the product and into a heat-sealed condition with itself; and, (f) opening the chamber to atmospheric air to permit disassembly of the chamber and removal of the vacuum skin package.

2. The method of claim 1 wherein the film is heated while in contact with the inner surface portions of the member.

3. The method of claim 1 wherein the film is heated prior to being formed into the U-shaped configuration.

4. The method of claim 1 wherein substantially all of such outer surface portions of the film within a U-shaped opening of one member and not engaged by another member are brought to a condition of reduced pressure and are exposed to atmospheric air.

5. The method of claim 1 including the further step of maintaining at least the reduced pressure condition in the interior of the chamber and on the product while permitting such outer surface portions of the film to be exposed to atmospheric air so as to push the film around the product and into the heat-sealed condition with itself.

* * * * *